United States Patent [19]

Shekel

[11] Patent Number: 5,826,122
[45] Date of Patent: Oct. 20, 1998

[54] APPARATUS AND METHOD FOR TRANSMITTING IMAGES TO A REMOTE LOCATION

[76] Inventor: Eyal Shekel, 22 Haportzim Street, Jerusalem, Israel, 92541

[21] Appl. No.: 779,345

[22] Filed: Jan. 6, 1997

[51] Int. Cl.⁶ ................................................ G03B 29/00
[52] U.S. Cl. ........................... 396/429; 348/552; 355/20; 358/302
[58] Field of Search ............................. 396/429; 355/20, 355/21, 40; 348/552; 358/302, 487, 527; 386/42, 128, 130

[56] References Cited

U.S. PATENT DOCUMENTS

| | | | |
|---|---|---|---|
| 2,483,147 | 9/1949 | Mol | 355/20 |
| 2,813,456 | 11/1957 | Ostrov | 355/21 |
| 3,259,008 | 7/1966 | Buck | 396/544 |
| 3,696,720 | 10/1972 | Vinson | 355/20 |
| 3,918,810 | 11/1975 | Cohen | 355/20 |
| 4,001,847 | 1/1977 | McGrath . | |
| 4,191,962 | 3/1980 | Sramek | 396/317 |
| 4,373,156 | 2/1983 | Pfannkuch et al. . | |
| 4,481,541 | 11/1984 | Ioannidis et al. . | |
| 4,521,104 | 6/1985 | Craig | 355/20 |
| 4,556,914 | 12/1985 | Vitek et al. . | |
| 4,566,035 | 1/1986 | Samuel et al. . | |
| 4,627,004 | 12/1986 | Cool et al. . | |
| 4,709,271 | 11/1987 | Yamaguchi et al. . | |
| 4,841,371 | 6/1989 | Nishiyama et al. . | |
| 4,922,285 | 5/1990 | Torisawa et al. | 355/20 |
| 4,947,204 | 8/1990 | Endo | 355/20 |
| 5,027,220 | 6/1991 | Sunda . | |
| 5,285,226 | 2/1994 | Frosig et al. | 355/21 |
| 5,438,434 | 8/1995 | Saitoh | 358/487 |
| 5,477,353 | 12/1995 | Yamasaki | 358/487 |
| 5,512,396 | 4/1996 | Hicks | 355/40 |
| 5,666,215 | 9/1997 | Fredlund et al. | 358/487 |
| 5,689,610 | 11/1997 | Manico et al. | 348/552 |

Primary Examiner—A. A. Mathews
Attorney, Agent, or Firm—Darby & Darby

[57] ABSTRACT

A method for transmitting images to a remote location, including capturing an image from a network, local or global, displaying the image on a screen of a computer terminal and photographing the image as displayed on the screen, preferably while exposing a film for a duration on longer than a plurality of refreshes of the image on the screen.

29 Claims, 6 Drawing Sheets

APPARATUS AND METHOD FOR TRANSMITTING IMAGES TO A REMOTE LOCATION

FIELD OF THE INVENTION

The present invention relates to a method an system for transforming a computer generated image onto a film for producing hard-copy at near photographic quality.

BACKGROUND OF THE INVENTION

The explosive growth of the internet and the proliferation of inexpensive computer accessories designed to transfer pictures onto the personal computer have given rise to an unprecedented availability of high-quality video images accessible on and from the PC. Every internet user, regardless of service provider or web browser, has ready access to millions of high-quality photographs, video clips and animation art which can be easily downloaded and saved on the PC. Anyone with a standard VCR or camcorder and a personal computer can transfer any image from a professional or home recorded video tape onto a PC by using a readily available and affordable digitizing device.

However, there is no cost-effective means of producing quality hardcopy prints of these high-quality images. Computer peripherals and digital cameras are available that enable users to record and transfer still video images onto their PC's. The problem is that, once there, they can be viewed only on the PC screen. However, it is still very desirable to have traditional photographs of the images.

There are currently two existing technologies which produce hardcopy output of PC images. The present invention enjoys significant advantages over both as will be explained below. The first technology includes video printers. These devices, manufactured by Sony, Panasonic and others, enable a user to print out an image recorded with a video source and displayed on a PC screen onto photo-quality paper.

However, there are two significant disadvantages to the video printer:
1. Cost: Video printers cost several hundred dollars to purchase, a significant barrier to entry in the recreational consumer market. More significantly, however, the cost per print on the video printer ranges between $1.50 and $2.50. The cost is attributable to the high costs of chemicals and special paper utilized by the video printer. This contrasts with a production cost of under $2 for the present invention and a per print cost of about 25 cents.
2. Convenience: There are many local stores in most industrialized countries which now offer the possibility of printing stored images provided by the customer on a video printer. However, these vendors generally require the consumer to provide them with a diskette in pre-edited form. This is both time consuming and requires more expertise in image editing than the average consumer has.

The second technology includes color printers. There are essentially three types of color printers: color-laser, dye sublimation and ink jet. Color laser and dye sublimation printers provide near photo quality output but they cost several thousand dollars which puts them well out of the reach of all but the highest end users. In addition, the cost per print on a high-quality color laser is over $1, more than 4 times the cost per print of the present invention. Low end color ink jet printers can be purchased for as little as $250. However, the quality of the output is generally quite poor and not at all comparable with the photo quality images produced by the present invention. Ink jet printers also suffer from the inconvenience of very long printing time while printing in the color mode. The other major drawback in using a color printer for hardcopy output is that the result is nothing more than a piece of paper, not a high-quality photograph. Ink jet printing results can be improved somewhat by using special paper to enhance color and resolution but the paper itself can cost more than twice what a standard photo print will cost using the present invention and even then, the quality of the output will still not match that of the present invention.

Other methods of taking a picture of a screen found in the prior art include U.S. Pat. No. 4,001,847 to McGrath, which describes a camera for photographing an oscilloscope screen or a cathode-ray tube including a housing having a lens mounted therein with a first opening on one side of the lens for aligning with the oscilloscope screen and a second opening at the other side of the lens for receiving a film cassette. Magnetic means is provided for mounting the film cassette on the camera housing at the second opening including a strip of flexible or resilient magnet material about the opening and a strip of magnetic material on the film cassette.

However, in McGrath, the size and format of the image on the screen cannot be controlled and a different camera is designed for each screen. In contrast, as will be described hereinbelow, in the present invention the size and format of the image on the screen is controlled to produce a full image on the film. This method permits using the same camera with various screens. Additionally, in McGrath, the exposure time is not very important due to the method of image formation on the screen of a measurement instrumentation. In instruments such as oscilloscopes, and multichannel analyzers, the image is formed only at the points where a signal should appear and the screen is engineered to maintain the image from cycle to cycle. On a computer screen however, the image is formed on the whole screen. The image is renewed (refreshed) on the screen between 60 to 75 times per second. During each cycle, the image on the screen decays. This decay is unnoticed by the user due to the low response time of the human eye. However, a film which will be exposed for a short period of time will detect this decay.

U.S. Pat. No. 4,481,541 to Ioannidis, describes a camera for photographing the image on CRT monitors that locates a magazine containing a roll of film below a vertical aperture plate and a cassette above the aperture plate to receive the exposed film so that the film exposed through the opening in the aperture plate will not sag and distort the image received from the lens due to gravity. Magnets hold a pressure plate against the aperture plate to keep the film flat and properly positioned against the aperture plate. Apparatus is provided to cut the film between the aperture plate and the cassette to allow the cassette to be removed from time to time to develop the exposed film contained therein.

U.S. Pat. No. 4,566,035 to Samuel et al describes a CRT monitor with built-in camera. The CRT is pivotally mounted in an enclosure which includes an integral camera. Photographs of the image on the screen of the CRT can be made by depressing the CRT and exposing the photograph.

U.S. Pat. No. 4,373,156 to Pfannkuch et al describes a system and method for producing rapid, high resolution hard color copies from computer-based graphics and image processing, including a computer-controlled color video signal graphics system for producing electronically generated digital character and/or graphics data in response to programmed commands that are input to the graphics system. Thereafter, the graphics system transforms the digital data into blue, green and red color video signals which are input to a color camera system through a color control panel that is controlled by a microprocessor. The color control panel sequentially switches each of the red, blue and green video signals through to a video monitor where the signals are transformed into video images on a screen of the monitor. The video images appearing on the screen of the monitor are filtered by a color filter wheel which is also controlled by the microprocessor of the camera system. One of two types of film may be selected for exposure to the filtered video images. The video images are timed by the microprocessor so that the film medium will be exposed to each of the filtered video images for the proper length of time required to sensitize the film for each particular color of video signal. The color control panel of the camera system may also be operated to meter the brightness of the video images appearing on the screen of the monitor and to thereafter adjust the contrast and brightness of the video images.

U.S. Pat. No. 4,556,914 to Vitek et al describes photographic documentation apparatus for obtaining high resolution and continuous tone photographs of a TV monitor or CRT (Cathode Ray Tube) image. The apparatus including a main housing adapted to be mounted on the monitor to prevent movement and assure sharp photographs, a cover for opening the housing to view the monitor, and multiple camera carriages adapted to be mounted on the main housing, each carriage being designed to hold a different camera, and including a guide or indicia indicating the exact setting of each carriage in the main housing. Means are provided for adjusting the position of the camera. In contrast, as will be described hereinbelow, adjustment apparatus is not required in the present invention. Vitek et al also includes apparatus for supporting a camera in a rigid position secured to the screen. In contrast, as will be described hereinbelow, in the present invention no such apparatus is required and the camera is hand held, and positioned in place in accordance to the marks set by software.

All the methods disclosed in the prior art are complicated, expensive and do not provide any control over the image. The prior art methods are only applicable to one type of screen. Additionally, in the prior art a special mechanism is required to allow the user to view the screen when the camera is mounted on the screen to make sure that it is correctly positioned on the desired part of the image.

SUMMARY OF THE INVENTION

The present invention seeks to provide improved methods and apparatus for transmitting images to a remote location. The present invention allows capturing an image from a network, local or global, displaying the image on a screen of a computer terminal and photographing the image as displayed on the screen without any need for expensive apparatus or software for producing the photograph.

The present invention exploits the fact that both standard computer screens and 35 millimeter film boast resolutions and number of colors far superior to any mainstream commercial printer. Therefore downloading the image on a screen and imaging the screen on film will result in a near photographic quality image.

In accordance with a method of the present invention, an image is downloaded on a screen in a predetermined dimension and format. The image is then recorded onto a film via a lens or pinhole. A shutter exposes the film for a time period preferably between $\frac{1}{15}$ to 2 seconds. The exposure time is set in order to allow several cycles of screen refresh. A shorter period of time causes part of the image to be under exposed and results in dark lines across the image. A longer exposure time results in smear and blurring of the image.

Software is used to present the image on the screen in an appropriate size, so that, together with a hood, the image will fill the film in the camera. The image may be adjusted accordingly in order to preserve proportionality of the image. The software presents the image on the screen in an appropriate position and creates a black background to the image. This avoids exposing the film with background light and compensates in a case wherein the dimension of the image is smaller than the film (in one dimension). The software further marks the correct position of the hood on the screen, and optionally provides color correction necessary due to the color response of the film in order to achieve hard copies with the correct colors.

The hood positions the film and lens in an appropriate distance from the screen so as to optimally focus the image and blocks any external light from reaching the film. The hood is preferably collapsible.

The present invention thus provides an innovative camera for photographing high-quality images produced on standard PC monitors. The camera is very easy to use, utilizes standard 35 millimeter film, may be easily held against the PC monitor and with the press of a single button produces an outstanding reproduction of the high-quality image on the monitor every time. The custom software automatically converts any image into the exact size required for an optimal photograph. There is never a problem of improper focusing, over or underexposure or poor positioning.

There is thus provided in accordance with a preferred embodiment of the present invention, a method for transmitting images to a remote location, comprising transmitting an image via a network to a computer, displaying the image on a screen of a terminal of the computer; and photographing the image as displayed on the screen with photographic apparatus.

There is also provided in accordance with another preferred embodiment of the present invention, a method for transmitting images to a remote location, comprising grabbing an image from a video source, transmitting the image to a computer, displaying the image on a screen of a terminal of the computer; and photographing the image as displayed on the screen with photographic apparatus.

There is also provided in accordance with yet another preferred embodiment of the present invention, a method for transmitting images to a remote location, comprising capturing an image from a computer disk, hard or floppy, transferring the image to a computer, displaying the image on a screen of a terminal of the computer, and photographing the image as displayed on the screen with photographic apparatus.

In accordance with a preferred embodiment of the present invention, the method may include controlling a size of the image being displayed on the screen, creating a black background around the image being displayed on the screen, displaying on the screen a position for placing thereagainst a photography hood, and/or correcting a color of the image being displayed on the screen.

There is also provided in accordance with a preferred embodiment of the present invention, apparatus for photographing an image from a screen of a computer terminal, comprising a camera comprising a lens which projects the image on a film, a shutter for selectively exposing the film, and a shutter tripping mechanism which trips the shutter to allow exposure of the film for a duration longer than a plurality of refreshes of the image on the screen, and a collapsible hood manually abuttable against the screen, the camera being fixable to the hood such that the image may be projected on the film, the hood substantially blocking any light rays not emanating from the screen from reaching the lens.

In accordance with a preferred embodiment of the present invention, the shutter tripping mechanism trips the shutter to allow exposure of the film for a duration longer than 1/60 of a second.

Additionally in accordance with a preferred embodiment of the present invention, the hood maintains the camera at a fixed distance from the screen.

Further in accordance with a preferred embodiment of the present invention, the hood comprises frictional stops for substantially preventing sliding of the hood on the screen after placement thereagainst.

Still further in accordance with a preferred embodiment of the present invention, a support device is provided for maintaining the hood in a non-collapsed configuration.

In accordance with a preferred embodiment of the present invention, graphics apparatus is provided for controlling a size of the image being displayed on the screen, for creating a black background around the image being displayed on the screen, for displaying on the screen hood position markers, and/or for providing color correction of the image being displayed on the screen.

BRIEF DESCRIPTION OF THE DRAWINGS

The present invention will be understood and appreciated more fully from the following detailed description, taken in conjunction with the drawings in which:

FIGS. 4 and 5 are simplified illustrations of a shutter tripper mechanism, constructed and operative in accordance with a preferred embodiment of the present invention, and useful with the photographic apparatus of FIG. 1, wherein FIGS. 4 and 5 illustrate the shutter tripper mechanism during loading of film;

DETAILED DESCRIPTION OF A PREFERRED EMBODIMENT

Figure 1A:
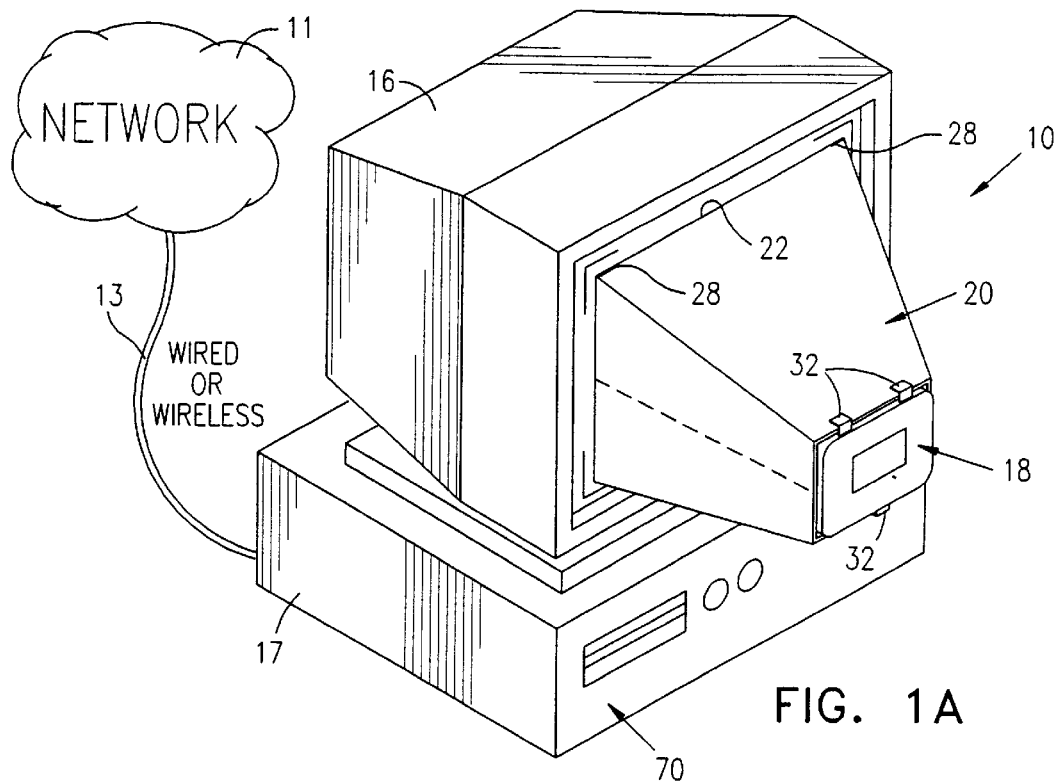
FIGS. 1A, 1B and 1C are simplified pictorial illustrations of photographic apparatus for photographing an image from a screen of a computer terminal, constructed and operative in accordance with a preferred embodiment of the present invention, the image being downloaded from a network, video apparatus and a storage medium, respectively.

Reference is now made to FIGS. 1A, 1B, 1C and 2 which illustrate photographic apparatus 10 for photographing an image 12 from a screen 14 of a terminal 16 of a computer 17, constructed and operative in accordance with a preferred embodiment of the present invention. Computer 17 may be any type of computer, such as a personal computer, having suitable graphics, such as VGA or Super VGA, for displaying image 12 on screen 14.

In FIG. 1A, image 12 is preferably transmitted via a network 11, which may be local, or alternatively global, such as the Internet. Computer 17 is preferably provided with an input communications link 13, wired or wireless, for receiving image 12, typically in the form of a graphics file.

Figure 1B:
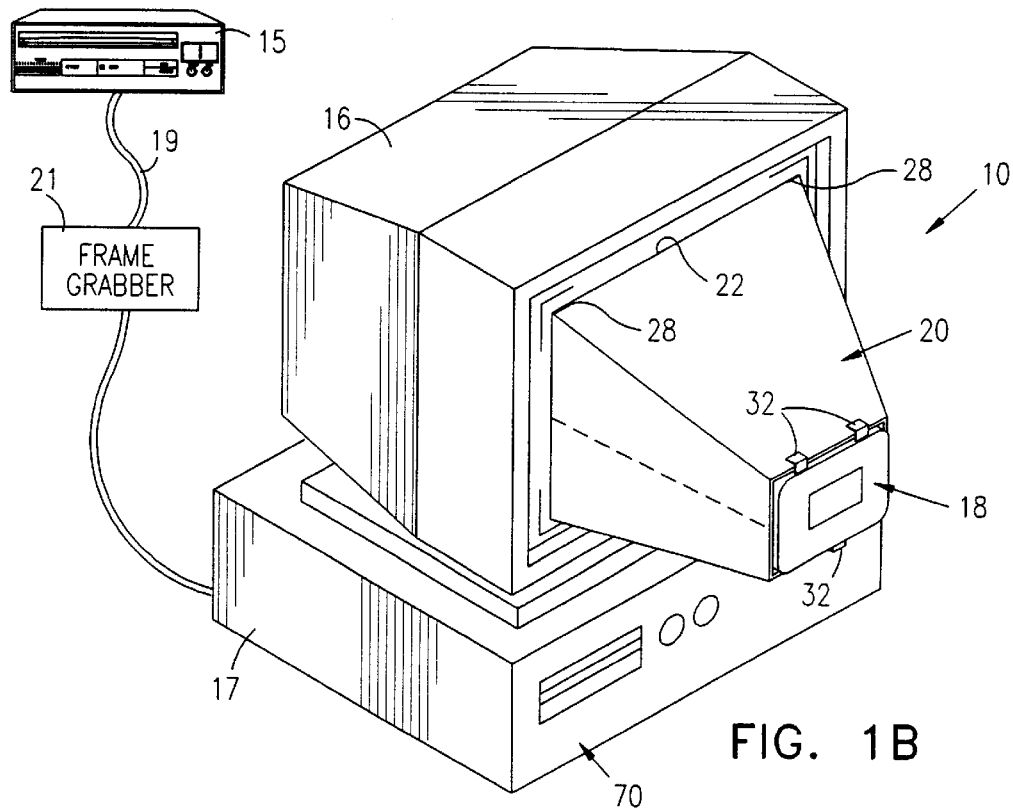

In FIG. 1B, image 12 is preferably a frame grabbed from a video source 15, which may be a VCR, CCD video camera or other video equipment. Computer 17 is preferably provided with an input communications link 19 and a frame grabber 21, for grabbing image 12 from video source 15.

Figure 1C:
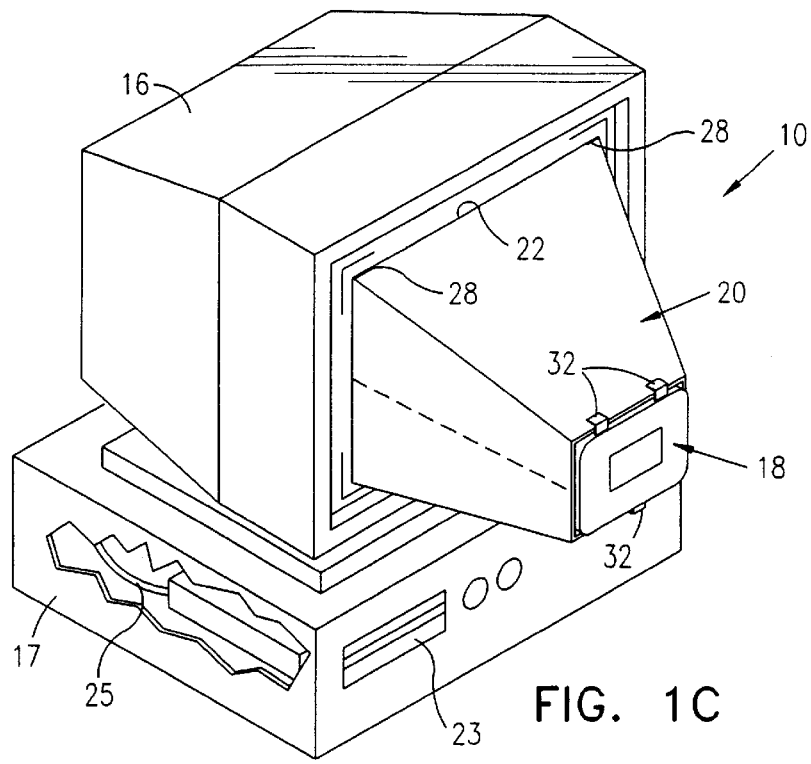

In FIG. 1C, image 12 is preferably captured from a storage medium 23, which may be a hard disk or floppy disk, on which are stored graphics files. Computer 17 is preferably provided with an input communications link 25 for receiving image 12 from storage medium 23 for eventual display on screen 14, link 25 typically being conventional I/O apparatus for communication with hard/floppy disks.

Apparatus 10 preferably includes a camera 18 which is fixable to a hood 20. Hood 20 preferably includes a screen surface 22 which may be abutted against screen 14. Screen surface 22 is preferably generally rectangular, although it is appreciated that any other arbitrary shape is in the scope of the invention. Hood 20 preferably has a pair of apertures 24 and 26 formed therein through which image 12 may be viewed. In accordance with a preferred embodiment of the present invention, screen surface 22 is provided with frictional stops 28 for substantially preventing sliding of hood 20 on screen 14 after placement thereagainst. Two frictional stops 28 are visible in FIGS. 1 and 2, although preferably four are provided at each of the corners of screen surface 22. Frictional stops 28 may be typically made of rubber, and are preferably set flush with screen surface 22 so that screen surface 22 may abut against screen 14 so as to substantially block any light rays not emanating from screen 14 from reaching a lens 30 of camera 18.

Camera 18 preferably includes tabs or brackets 32 for abutting against hood 20. Hood 20 preferably maintains camera 18 at a fixed distance from screen 14.

Figure 2:
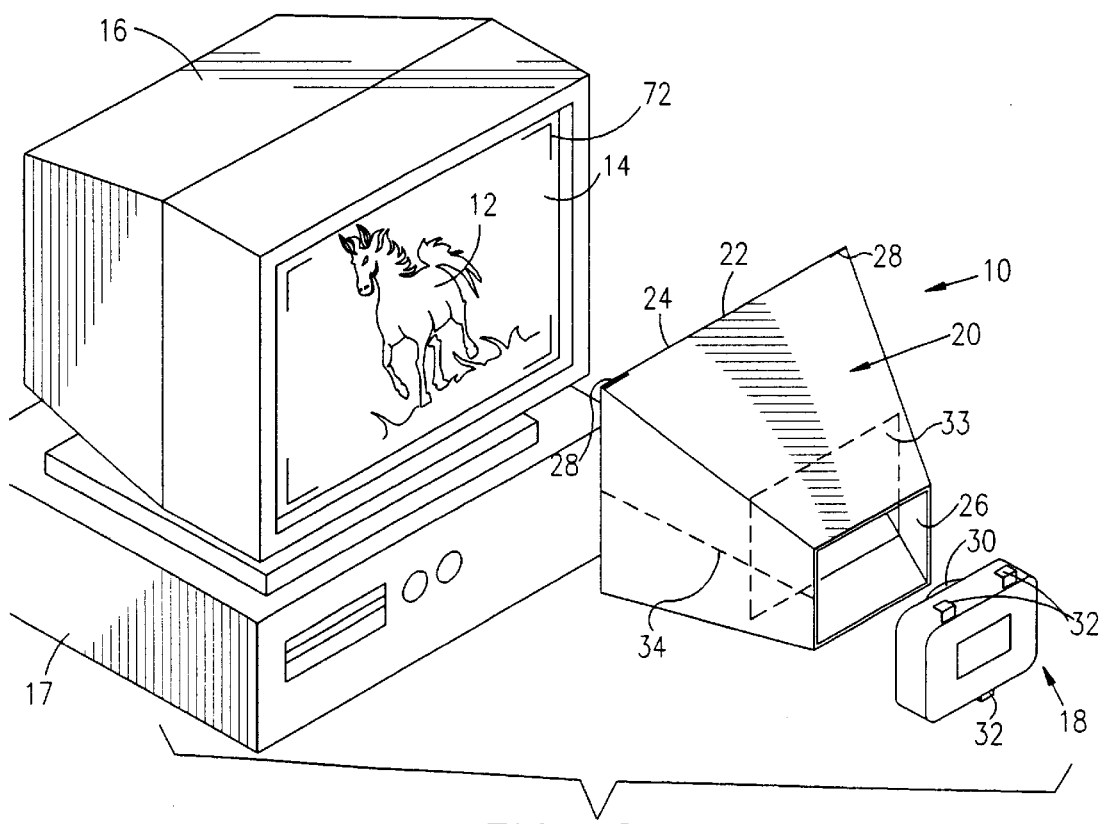
FIG. 2 is a simplified exploded illustration of photographic apparatus of FIGS. 1A, 1B and 1C.
Figure 3A:
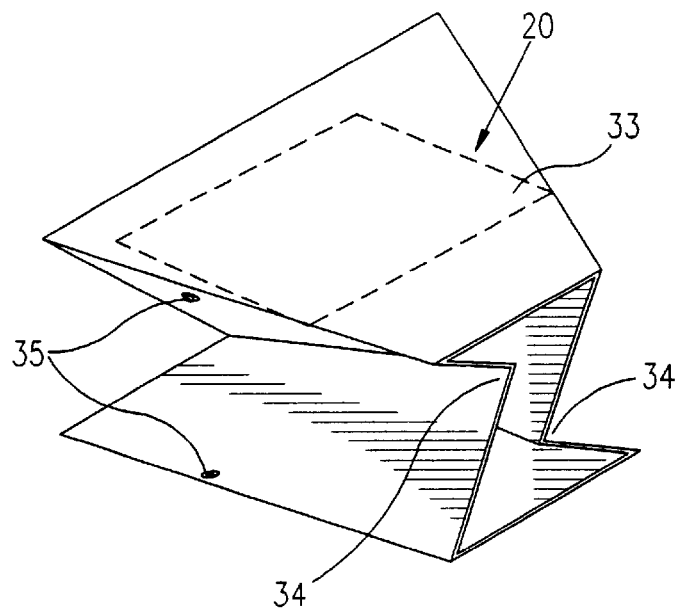
FIGS. 3A and 3B are simplified pictorial illustrations of a collapsible hood, partially collapsed and almost fully collapsed, respectively, constructed and operative in accordance with a preferred embodiment of the present invention, and useful with the photographic apparatus of FIG. 1.
Figure 3B:
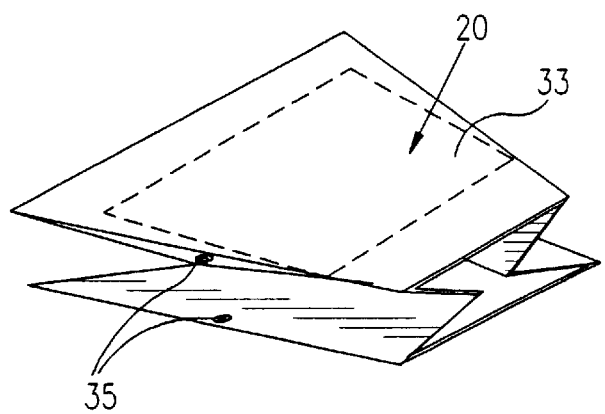

Reference is now further made to FIGS. 3A and 3B, in which it is seen that hood 18 is preferably collapsible along fold lines 34. FIG. 3A illustrates hood 18 partially collapsed and FIG. 3B illustrates hood 18 almost fully collapsed. A support device, such as a support sheet 33 may be provided to help maintain hood 20 in the fully deployed configuration of FIGS. 1 and 2. Support sheet 33 is preferably an integral part of hood 20 and folds inwards into hood 20, as seen in FIGS. 3A and 3B. Two snaps 35 may be provided for holding hood 20 in a fully collapsed configuration.

Figure 4:
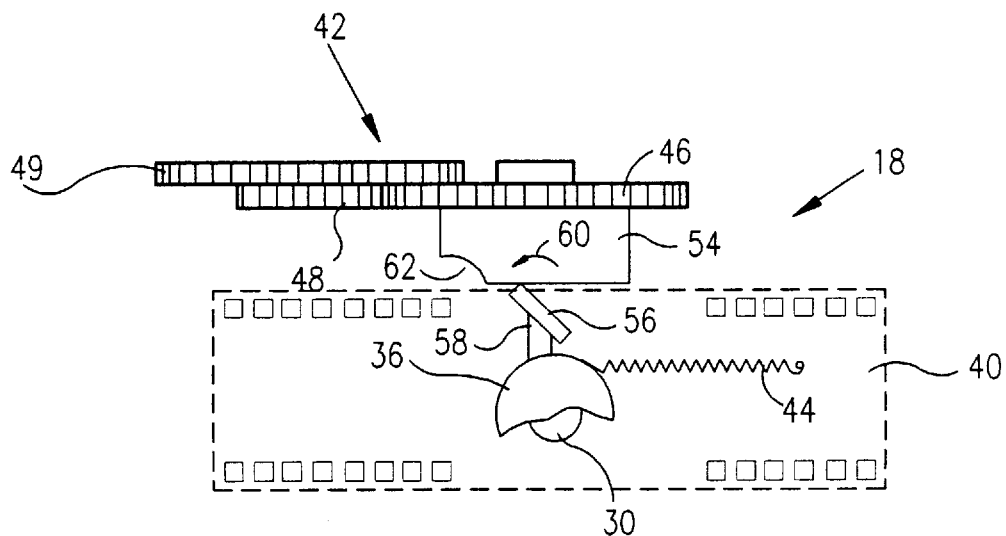
Figure 5:
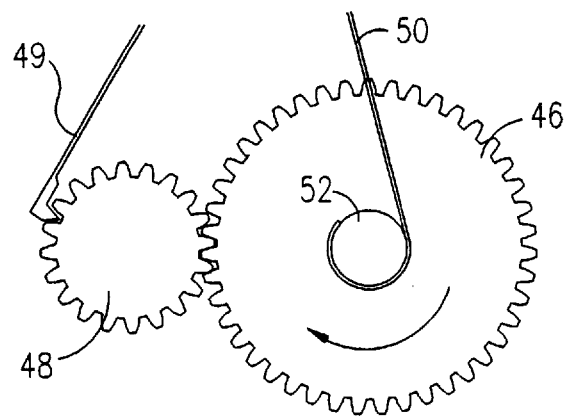

Reference is now made to FIGS. 4 and 5 which further illustrate portions of camera 18. Camera 18 preferably includes a shutter 36 for selectively exposing a film 40. A film holder 38 is provided for holding and scrolling film 40, as is well known in the art. In accordance with a preferred embodiment of the present invention, a shutter tripping mechanism 42 is provided which trips shutter 36 to allow exposure of film 40 for a duration longer than a plurality of refreshes of image 12 on screen 14, as will now be described. Preferably, shutter tripping mechanism 42 trips shutter 36 to allow exposure of film 40 for a duration longer than 1/60 of a second, and most preferably, between 1/15 and 1/2 of a second.

Shutter 36 is kept normally closed, i.e., prevents exposure of film 40, by a biasing member, such as a spring 44.

Shutter tripping mechanism 42 preferably includes a pair of gears 46 and 48, having a gear ratio of typically 3:1. A spring loaded pawl 49 engages teeth of gear 48. A rotational biasing member, such as a spring 50, is preferably wrapped around a shaft 52 of gear 46. During loading of film in camera 18, gear 46 makes one full turn clockwise and spring 50 wraps around shaft 52. A stop (not shown) stops gear 46, preferably exactly after one turn. Rotation of gear 46 one full turn causes gear 48 to make three full revolutions. A release mechanism (not shown) is preferably provided for releasing gear 46 from the stop. The stop and release mechanism are preferably entirely conventional and well known in the art, and are therefore not described further.

A wheel 54 is preferably connected to gear 46. Wheel 54 contacts a shoe 56 pivoted to an end 58 of shutter 36. Shoe 56 is free to rotate generally in the direction of an arrow 60 but not in a direction opposite to arrow 60. During loading of the film, wheel 54 turns together with gear 46, but shutter 36 does not open since shoe 56 is free to rotate in the direction of arrow 60.

In order to trip shutter 36, the release mechanism releases the stop and spring 50 causes gear 46 to rotate counterclockwise. Spring loaded pawl 49 retards the rotational motion of gear 48, and therefore also that of gear 46. A combination of at least three factors determine the time it takes gear 46 to make a full turn: the strength of spring 50, the strength of spring loaded pawl 49, and the gear ratio.

Figure 6:
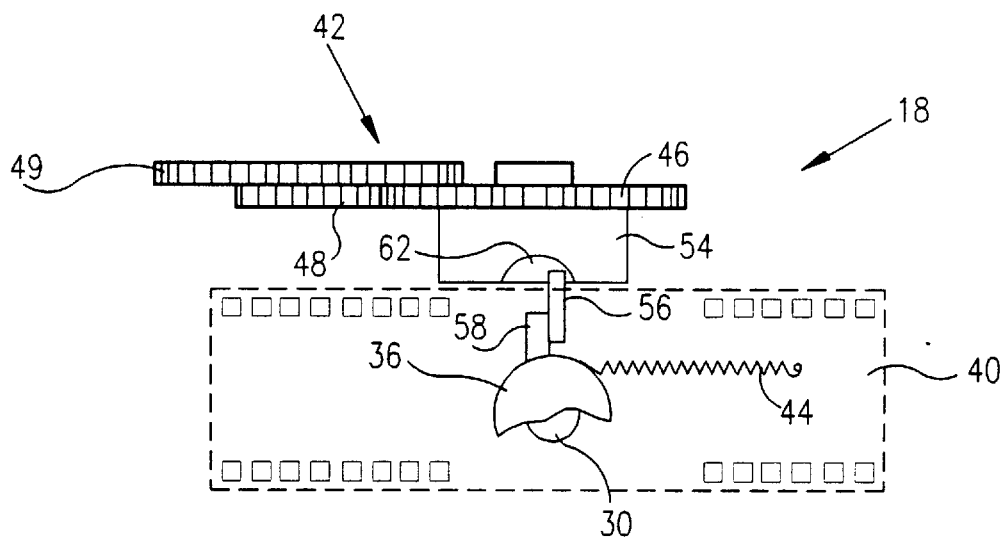
FIG. 6 is a simplified illustration of the shutter tripper mechanism after loading of film and before exposure of the film.

Reference is now made to FIG. 6 which illustrates shutter tripper mechanism 42 after loading of film and before exposure of the film. It is seen that shutter 36 is still closed, i.e., still prevents exposure of film 40. Shoe 56 is located in a groove 62 formed in wheel 54.

Figure 7:
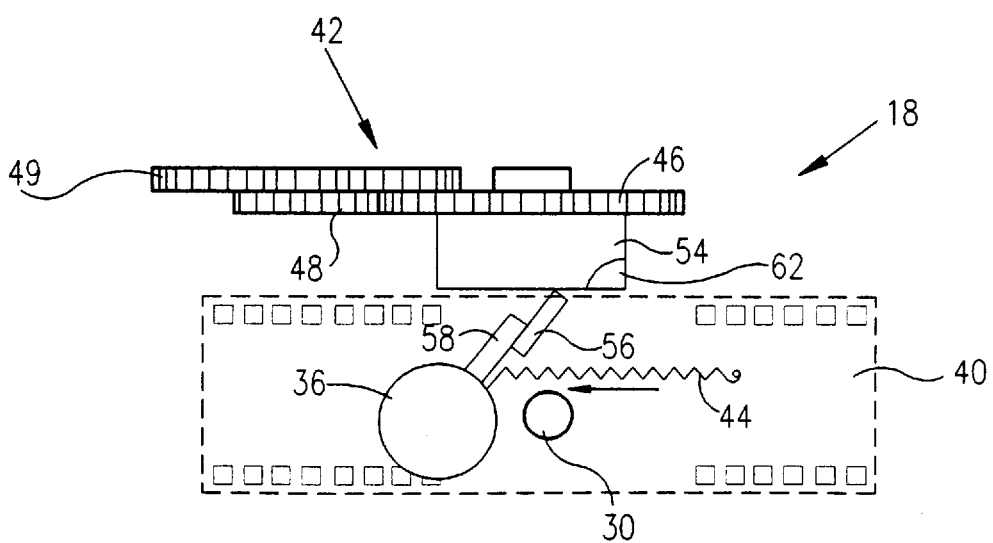
FIG. 7 is a simplified illustration of the shutter tripper mechanism during exposure of the film.

Reference is now made to FIG. 7 which illustrates shutter tripper mechanism 42 during exposure of the film. During exposure, wheel 54 moves together with gear 46 counterclockwise, and shoe 56 pushes shutter 36 open. Shutter 36 remains open only as long as wheel 54 pushes against shoe 56. However, after gear 46 turns sufficiently, shoe 56 again sits in groove 62 and shutter 36 closes. The rotational speed of gear 46 and the geometry of groove 62, inter alia, determine the exposure time.

Figure 8:
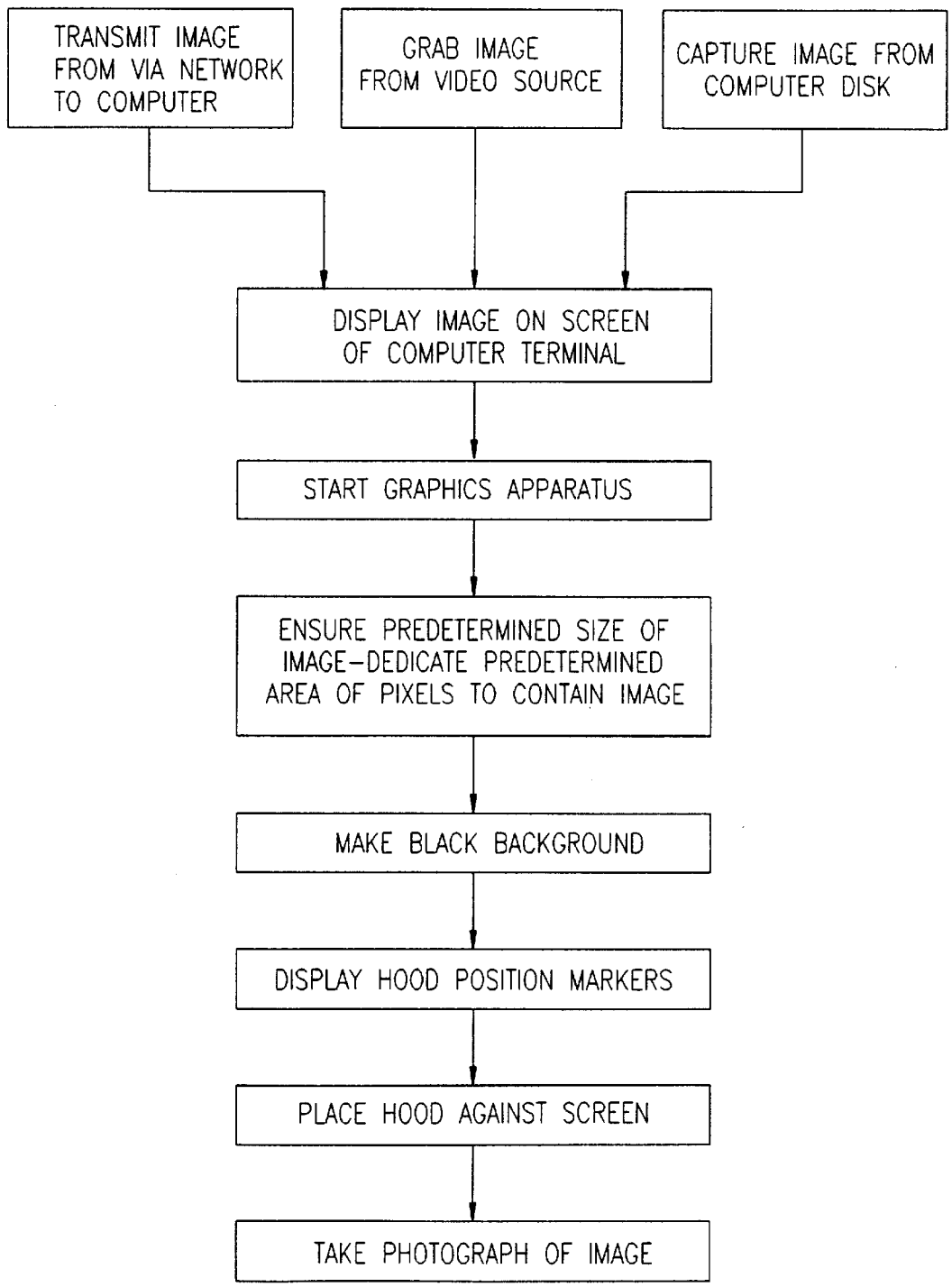
FIG. 8 is a simplified flow chart illustration a method for transmitting images to a remote location, in accordance with a preferred embodiment of the present invention.

Reference is now made to FIG. 8 which is a simplified flow chart illustration of a method for transmitting images to a remote location, in accordance with a preferred embodiment of the present invention.

In accordance with one preferred embodiment of the present invention, an image is transmitted via a network to a computer. The image is then displayed on a screen of a computer terminal, whereupon the image may then be photographed with photographic apparatus, such as the photographic apparatus described hereinabove.

In accordance with another preferred embodiment of the present invention, an image is grabbed from a video source, and then transmitted to a computer and displayed on a screen of a terminal of the computer. The image may then be photographed with photographic apparatus, such as the photographic apparatus described hereinabove.

In accordance with yet another preferred embodiment of the present invention, an image is captured from a storage medium, such as a hard or floppy disk. The image is then transferred to a computer and displayed on a screen of a terminal of the computer. The image may then be photographed with photographic apparatus, such as the photographic apparatus described hereinabove.

In accordance with a preferred embodiment of the present invention, the method may include controlling a size of the image being displayed on the screen, creating a black background around the image being displayed on the screen, displaying on the screen a position for placing thereagainst a photography hood, and/or correcting a color of the image being displayed on the screen.

In accordance with a preferred embodiment of the present invention, graphics apparatus 70 is provided which may be similar to readily available viewing software for displaying computer graphics files on a display screen. However, in addition to conventional features of such software, graphics apparatus 70 of the present invention also ensures a predetermined size of the image, regardless of screen size. This may be accomplished by dedicating a predetermined area of pixels to contain the image and making the rest of the screen display a black background of black pixels. In addition, graphics apparatus 70 preferably displays on screen 14 a plurality of hood position markers 72 (FIGS. 1 and 2). Hood position markers 72 aid a user to properly position hood 20 against screen 14, thus obviating any need to preview the image on the screen before taking a photograph thereof.

Moreover, graphics apparatus 70 preferably provides color correction of the image being displayed on the screen such that the color response of the screen and color response of the film will provide a final hard copy with true colors.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

What is claimed is:

1. Apparatus for photographing an image from a screen of a computer terminal, comprising:
   a camera comprising:
      a lens which projects said image on a film;
      a shutter for selectively exposing said film; and
      a shutter tripping mechanism which trips said shutter to allow exposure of said film for a duration longer than a plurality of refreshes of said image on said screen;
   a hood manually abuttable against said screen, said camera being fixable to said hood such that said image may be projected on said film; and
   graphics apparatus for controlling a size of said image being displayed on said screen.

2. Apparatus according to claim 1 wherein said hood substantially blocks any light rays not emanating from said screen from reaching said lens.

3. Apparatus according to claim 1 and wherein said shutter tripping mechanism trips said shutter to allow exposure of said film for a duration longer than $\frac{1}{60}$ of a second.

4. Apparatus according to claim 1 and wherein said shutter tripping mechanism trips said shutter to allow exposure of said film for a duration between $\frac{1}{15}$ and 2 seconds.

5. Apparatus according to claim 1 wherein said hood is collapsible.

6. Apparatus according to claim 1 wherein said hood comprises a support device for maintaining said hood in a non-collapsed configuration.

7. Apparatus according to claim 1 wherein said hood maintains said camera at a fixed distance from said screen.

8. Apparatus according to claim 1 and wherein said hood comprises frictional stops for substantially preventing sliding of said hood on said screen after placement thereagainst.

9. Apparatus according to claim 1 and comprising graphics apparatus for creating a black background around said image being displayed on said screen.

10. Apparatus according to claim 1 and comprising graphics apparatus for displaying on said screen hood position markers.

11. Apparatus according to claim 1 and comprising graphics apparatus which provide color correction of said image being displayed on said screen.

12. A photography system comprising:

a computer terminal including a CRT display having a display screen of at least first dimensions;

a camera arranged to photograph an image on the CRT display; p1 a hood arranged to be abutted to said screen at a location on said display screen within said first dimensions, thereby defining a hooded region on said display screen having second dimensions, less then said first dimensions; and computer terminal operating software controlling the operation of said CRT display to cause said image to appear on said computer terminal within an image area within said hooded region, said image area having third dimensions less than said second dimensions.

13. A photography system according to claim 12 and wherein said camera and said hood are handheld during operation.

14. A photography system according to claim 12 and wherein said hood is collapsible.

15. A photography system according to claim 12 and wherein said hood comprise a support device for maintaining said hood in a non-collapsed configuration.

16. A photography system according to claim 12 and wherein said hood maintains said camera at a fixed distance from said screen.

17. A photography system according to claim 12 and wherein said hood comprises frictional stops for substantially preventing sliding of said hood on said screen after placement thereagainst.

18. A photography system according to claim 12 and also comprising graphics apparatus for creating a black background around said image being displayed on said screen.

19. A photography system according to claim 12 and also comprising graphics apparatus for displaying hood positioning markets on said screen.

20. A photography system according to claim 12 and Also comprising graphics apparatus for providing color correction of said image being displayed on said screen.

21. A photography system for use with a computer terminal including a CRT display having a display screen of at least first dimensions, the system comprising:

a camera arranged to photograph an image on the CRT display;

a hood arranged to be abutted to said screen at a location on said display screen within said first dimensions, thereby defining a hooded region on said display screen having second dimensions, less than said first dimensions; and computer terminal operating software controlling the operation of said computer terminal to cause a said image to appear on said CRT display within an image area within said hooded region, said image area having third dimensions less than said second dimensions.

22. A photography system according to claim 21 and wherein said camera and said hood are handheld during operation.

23. A photography system according to claim 21 and wherein said hood in collapsible.

24. A photography system according to claim 21 and wherein said hood comprises a support device for maintaining said hood in a non-collapsed configuration.

25. A photography system according to claim 21 and wherein said hood maintains said camera at a fixed distance from said screen.

26. A photography system according to claim 21 and wherein said hood comprises frictional stops for substantially preventing sliding of said hood on said screen after placement thereagainst.

27. A photography system according to claim 21 and also comprising graphics apparatus for creating a black background around said image being displayed on said screen.

28. A photography system according to claim 21 and also comprising graphics apparatus for displaying hood positioning markers on said screen.

29. A photography system according to claim 21 and also comprising graphics apparatus for providing color correction of said image being displayed an said screen.

* * * * *